(12) United States Patent
Andersson et al.

(10) Patent No.: US 10,301,998 B2
(45) Date of Patent: May 28, 2019

(54) HEAT EXCHANGER SYSTEM FOR TREATMENT OF A FLOW OF EXHAUST GASES IN AN EXHAUST GAS AFTERTREATMENT SYSTEM

(71) Applicant: VOLVO TRUCK CORPORATION, Gothenburg (SE)

(72) Inventors: Lennart Andersson, Varberg (SE); Martin Lunden, Mölndal (SE)

(73) Assignee: Volvo Truck Corporation, Göteborg (SE)

( * ) Notice: Subject to any disclaimer, the term of this patent is extended or adjusted under 35 U.S.C. 154(b) by 167 days.

(21) Appl. No.: 15/319,769

(22) PCT Filed: Jun. 27, 2014

(86) PCT No.: PCT/EP2014/001755
§ 371 (c)(1),
(2) Date: Dec. 17, 2016

(87) PCT Pub. No.: WO2015/197093
PCT Pub. Date: Dec. 30, 2015

(65) Prior Publication Data
US 2017/0138242 A1    May 18, 2017

(51) Int. Cl.
*F01N 3/28* (2006.01)
*F01N 3/10* (2006.01)
(Continued)

(52) U.S. Cl.
CPC ........... *F01N 3/2889* (2013.01); *F01N 3/021* (2013.01); *F01N 3/106* (2013.01); *F01N 3/2066* (2013.01);
(Continued)

(58) Field of Classification Search
CPC ........ F01N 3/2889; F01N 3/021; F01N 3/106; F01N 3/2066; F01N 3/009;
(Continued)

(56) References Cited

U.S. PATENT DOCUMENTS 6,312,650 B1 * 11/2001 Frederiksen ....... B01D 53/9431
181/264
6,680,037 B1 * 1/2004 Allansson ............. F01N 3/0231
422/168
(Continued)

FOREIGN PATENT DOCUMENTS

DE          10221174 A1    1/2004
DE     102007053130 A1    5/2009
(Continued)

OTHER PUBLICATIONS

International Search Report (dated Mar. 3, 2013) for corresponding International App. PCT/EP2014/001755.

*Primary Examiner* — Patrick D Maines
(74) *Attorney, Agent, or Firm* — WRB-IP LLP

(57) ABSTRACT

A heat exchanger system for treatment of a flow of exhaust gases in an exhaust gas aftertreatment system of a vehicle. The heat exchanger system includes a nitrogen monoxide (NO) oxidation site for oxidizing nitrogen monoxide to nitrogen dioxide (NO2). The NO oxidation site is positioned such that the flow of exhaust gases at a downstream end (40) of the NO oxidation site in use of the heat exchanger system is arranged to proceed at a temperature within a predetermined temperature interval corresponding to a desired NO to NO2 (NO:NO2) ratio interval in the flow of exhaust gases. An exhaust gas aftertreatment system and a vehicle including such a heat exchanger system, and a method for using such a heat exchanger system, are also provided.

29 Claims, 3 Drawing Sheets

(51) Int. Cl.
*F01N 3/20* (2006.01)
*F01N 3/021* (2006.01)
*F01N 13/00* (2010.01)

(52) U.S. Cl.
CPC ........ *F01N 13/009* (2014.06); *F01N 2240/02* (2013.01); *F01N 2340/02* (2013.01); *F01N 2410/00* (2013.01); *F01N 2470/22* (2013.01); *F01N 2490/06* (2013.01); *F01N 2510/068* (2013.01); *F01N 2560/026* (2013.01); *F01N 2570/12* (2013.01); *F01N 2570/14* (2013.01); *F01N 2590/08* (2013.01); *F01N 2610/02* (2013.01); *Y02A 50/2325* (2018.01); *Y02T 10/24* (2013.01)

(58) Field of Classification Search
CPC ............. F01N 2240/02; F01N 2410/00; F01N 2470/22; F01N 2510/068; F01N 2560/026; F01N 2570/12; F01N 2570/14; F01N 2610/02
See application file for complete search history.

(56) References Cited

U.S. PATENT DOCUMENTS

| | | | |
|---|---|---|---|
| 2006/0153748 A1* | 7/2006 | Huthwohl | B01F 3/04049 422/172 |
| 2008/0066451 A1* | 3/2008 | Warner | F01N 3/0253 60/286 |
| 2010/0212301 A1* | 8/2010 | De Rudder | F01N 3/2066 60/299 |
| 2010/0263352 A1* | 10/2010 | Hylands | B01D 53/90 60/273 |
| 2011/0138782 A1* | 6/2011 | Stieglbauer | F01N 3/021 60/274 |
| 2011/0219755 A1* | 9/2011 | Muller-Haas | F01N 3/035 60/287 |
| 2014/0360170 A1* | 12/2014 | Hacklander | F01N 3/2066 60/286 |

FOREIGN PATENT DOCUMENTS

| | | |
|---|---|---|
| EP | 2163741 A1 | 3/2010 |
| WO | 2014051500 A1 | 4/2014 |

* cited by examiner

HEAT EXCHANGER SYSTEM FOR TREATMENT OF A FLOW OF EXHAUST GASES IN AN EXHAUST GAS AFTERTREATMENT SYSTEM

BACKGROUND AND SUMMARY

The present disclosure relates to a heat exchanger system for treatment of a flow of exhaust gases in an exhaust gas aftertreatment system of a vehicle. The heat exchanger system comprises a nitrogen monoxide (NO) oxidation site for oxidising nitrogen monoxide to nitrogen dioxide (NO2). The present disclosure also regards an exhaust gas aftertreatment system and a vehicle comprising such a heat exchanger system, and a method for using such a heat exchanger system.

For meeting the legal emission requirements emission control and exhaust gas aftertreatment systems are generally necessary. Usually, such an exhaust gas aftertreatment system comprises an oxidation catalyst for oxidizing nitrogen monoxide (NO) to nitrogen dioxide (NO2), a particulate filter and a unit for reducing nitrogen oxides (NOx) emissions.

These devices are usually arranged as separate units in series, although many versions of combined configuration also appear. Since the different units influence each other, it has been proven as advantageous to arrange the oxidation catalyst upstream of the particulate filter and upstream the NOx reduction unit. This is due to the following reasons:

1. The oxidation reaction is exothermic, which means that heat is produced, which in turn increases the exhaust gas temperature. For reducing the deposition of soot in the particulate filter, it is desired to operate the particulate filter with exhaust gas having a high temperature. Consequently, the additional heat produced by the exothermic oxidation reaction may be used for increasing the efficiency of the particulate filter.

2. When using an Selective Catalytic Reduction (SCR) unit as NOx reduction unit, a NO:NO2 ratio in the vicinity of or approximately 50:50 is preferred for operating the SCR unit with high efficiency. Since exhaust gas exiting the internal combustion engine usually has a higher amount of NO than of NO2, it is advantageous to adapt the NO:NO2 ratio to the desired approx. 50:50 ratio by means of the upstream arranged oxidation catalyst.

Disadvantageously, regardless which arrangement of the different units is chosen, the number of different units arranged in the exhaust flow may result in a bulky and heavy exhaust gas aftertreatment system.

For further increasing the efficiency of the particulate filter and for further exploiting the heat produced by the exothermic reaction, it has also been suggested, e.g. in DE 102 21 174 B4, to include a counter-flow heat exchanger into the exhaust gas aftertreatment system for exchanging heat between exhaust gas streaming to the particulate filter and exhaust gas streaming from the particulate filter. Additionally, it has been suggested to include the oxidation catalyst into the heat exchanger.

Disadvantageously, by including the oxidation catalyst into the heat exchanger, the conversion of NO to NO2 cannot be controlled in a sufficient way. Moreover, the additional heat exchanger increases the number of devices used in the exhaust gas aftertreatment system.

It is desirable to provide a heat exchanger system which provides an improved NO:NO2 ratio control, which may be utilised e.g. in devices located downstream of the heat exchanger system.

According to a first aspect of the present, disclosure a heat exchanger system for treatment of a flow of exhaust gases in an exhaust gas aftertreatment system of a vehicle is disclosed. The heat exchanger system comprises a nitrogen monoxide (NO) oxidation site for oxidising nitrogen monoxide (NO) to nitrogen dioxide (NO2). The NO oxidation site is positioned such that the flow of exhaust gases at a downstream end of the NO oxidation site in use of the heat exchanger system is arranged to proceed at a temperature within as predetermined temperature interval corresponding to a desired NO to NO2 (NO:NO2) ratio interval in the flow of exhaust gases.

When the flow of exhaust gases from an engine, to which the heat exchanger system in use may be coupled, passes over the nitrogen monoxide (NO) oxidation site, nitrogen monoxide in the exhaust gases is oxidised into nitrogen dioxide. The oxidation process is temperature dependent. During relatively seen cold temperatures a majority of the nitrogen monoxide can from a thermodynamically standpoint be oxidised into nitrogen dioxide, where after increasing temperature only a small fraction of the nitrogen monoxide from a thermodynamically standpoint can be oxidised into nitrogen dioxide. On the other hand, at relatively seen cold temperatures the kinetics makes the oxidation of the nitrogen monoxide a slow process even with the best catalysts, and hence only a small fraction is oxidised into nitrogen dioxide. Increasing the temperatures, the kinetics makes the process faster and more nitrogen monoxide can be oxidised until it reaches the thermodynamically limits. Hence the amount of nitrogen monoxide which is oxidised into nitrogen dioxide is related to the temperature like an inverted V, where the peak of oxidation lies around approximately 250-400° C. and the resulting NO:NO2 ratio is between 70:30 and 20:80 (and thus the NO2 NOx ratio is between 30 and 80%), depending on catalyst and gas conditions. Reference here is made to FIG. 3, curve C. The curve describes an equilibrium state at each temperature, such that at each temperature, under otherwise optimum conditions, a known amount of nitrogen monoxide is oxidised into nitrogen dioxide which gives a certain NO:NO2 ratio. If the conditions are less than optimal the curve is still relevant, although the amount of nitrogen monoxide which is oxidised may be slightly less, but still at a known or foreseeable level. Knowing the appearance of the curve and the conditions under which it is operable it is possible according to the present disclosure to locate the NO oxidation site within the heat exchanger system such that a desired NO:NO2 ratio interval is achieved in the flow of exhaust gases when they pass over the NO oxidation site, and more particularly, when they proceed therefrom. The present disclosure hence gives the advantage of control of the nitrogen monoxide oxidation through placing in particular the downstream end of the nitrogen monoxide site at a location where a temperature interval of the heat exchanger system corresponds to the desired NO:NO2 ratio interval. The equilibrium curve thus indicates a temperature interval which is appropriate for the location within the heat exchanger system. When knowing the temperature distribution within the heat exchanger system it is consequently possible to reliably locate the NO oxidation site there within.

According to an embodiment the heat exchanger system comprises a further oxidation site for oxidising a further constituent of the flow of exhaust gases. Such a further oxidation site may be used to produce heat and thus to control the temperature within the heat exchanger system such that a relevant temperature interval may be achieved which in turn improves the control of the desired NO:NO2 ratio interval.

According to an embodiment the position of the downstream end of the NO oxidation site is adapted to the size and position of the further oxidation site. Hereby further control of the temperature interval and thus of the NO:NO2 ratio interval may be achieved.

According to an embodiment the NO oxidation site is positioned downstream of the further oxidation site. This is particularly relevant when the further oxidation site is known to consume any one or both of the nitrogen monoxide and the nitrogen dioxide. In such a case the NO:NO2 ratio interval may be made to deviate from the NO:NO2 ratio interval and the advantage of the present disclosure is reduced accordingly. A known consumer of these constituents is a methane oxidation site.

According to an embodiment the heat exchanger comprises a first guiding passage, a second guiding passage and a flow reversing region there between, whereby the first guiding passage is arranged to guide the flow of exhaust gases along a first flow direction towards the flow reversing region, and the second guiding passage is arranged to guide the flow of exhaust gases from the flow reversing region in a second flow direction, such that heat may be exchanged between the flow of exhaust gases in the second guiding passage and the flow of exhaust gases in the first guiding means. Hereby also a compact heat exchanger system is achieved.

According to an embodiment the heat exchanger system is a counter-flow heat exchanger, whereby the second guiding passage is arranged to guide the flow of exhaust gases in the second flow direction which is generally opposite to the first flow direction of the first guiding passage.

According to an embodiment the NO oxidation site is positioned within the second guiding passage. In this location the temperature is generally the highest within the heat exchanger system and the potential for raising the temperature to desired levels to achieve the desired NO:NO2 ratio interval is the greatest.

According to an embodiment the further oxidation site is positioned within the first guiding passage. Thereby the temperature will rise over the further oxidation site which heat will be used to control the temperature at the NO oxidation she.

According to an embodiment the NO oxidation site has an upstream end opposite to the downstream end, which upstream end is positioned immediately adjacent the flow reversing region. Hereby the largest possible surface area is attained for the NO oxidation site. The surface area, i.e. an active surface area, of the NO oxidation site may consequently be adapted such that e.g. a dwell time of the flow of exhaust gases in the proximity of, or over, the NO oxidation site is maximised to achieve that the chemical reaction taking place at the NO oxidation site is given the particular conditions to reach the intended equilibrium state indicated by the earlier mentioned equilibrium curve at the downstream end of the NO oxidation site.

According to an embodiment the further oxidation site is positioned immediately adjacent the flow reversing region. This will improve the temperature for the oxidising reaction for the further oxidation site.

According to an embodiment the further oxidation site is a hydrocarbon oxidation site for oxidising hydrocarbon (HC) to mainly carbon dioxide and water (H2O), more preferably for oxidising methane (CH4). Heat produced in particular by the exothermic methane oxidation may be exchanged within the heat exchanger system so that the required operating temperature for the methane oxidation at the further oxidation site is ensured as well as for the nitrogen oxidation at the NO oxidation site.

According to an embodiment the desired NO to NO2 (NO:NO2) ratio interval is 30:70-70:30 more preferably 40:60-60:40 and most preferably 45:55-55:45.

According to an embodiment the predetermined temperature interval is 350-420° C. more preferably 380-410° C. and most preferably 390-400° C.

According to an embodiment the NO oxidation site comprises an NO oxidation catalyst.

According to an embodiment the further oxidation site comprises a catalyst for oxidising the further constituent.

According to an embodiment an exhaust gas inlet is arranged to the first guiding passage, and an exhaust gas outlet is arranged to the second guiding passage.

According to an embodiment the downstream end of the NO oxidation site is positioned within a middle third part between the flow reversing region and a downstream end of the second guiding passage, preferably within a middle fourth part thereof, most preferably within a middle fifth part thereof. The inventors have realised that by coating approximately half of the second guiding means, corresponding to a downstream end of the NO oxidation site positioned within the middle fifth of the second guiding passage a desired NO:NO2 ratio of approximately 50:50 is achieved, which is an often desired ratio.

According to an embodiment a surface area of the second guiding passage is coated by the NO oxidizing catalyst to at least 33%, more preferably to at least 38%, and most preferably to at least 40%. This will achieve a desired NO:NO2 ratio interval.

According to an embodiment the heat exchanger system further comprises a third guiding passage for guiding at least part of the flow of exhaust gases from the exhaust gas inlet to a second flow reversing region, and a fourth guiding passage for guiding the flow of exhaust gases from the second flow reversing region to the exhaust gas outlet. Hereby the flow of exhaust gases may be divided into at least two sub-flows in order to treat the sub-flows differently to better control the desired result. In other words, the heat exchanger system may be split into two heat exchangers or heat exchanging regions, which may be arranged in physically separate devices. Alternatively, it is also possible to provide both heat exchangers in one system, e.g. in a heat exchanger system comprising at least four passages, wherein a first part of the passages, preferably approximately half of the passages, belong to the fast heat exchanger region and the other part belong to the second heat exchanger region. It should also be noted that the first flow reversing region and the second flow reversing region may be the same flow reversing region.

According to an embodiment the third guiding passage comprises a further oxidation site for oxidising a further constituent of the flow of exhaust gases. This may be either a similar or a different oxidation site with regard to the further oxidation site already mentioned earlier.

According to an embodiment the further oxidation site of the third guiding passage is a hydrocarbon oxidation site for oxidising hydrocarbon (HC) to mainly carbon dioxide (CO2) and water (H2O), more preferably for oxidising methane (CH4).

It may be preferred to coat the first and third guiding passage with the methane oxidizing catalyst material, but to coat only the second guiding passage with the nitrogen oxidizing catalyst. Thereby, the NO oxidation site may according to one embodiment cover approximately the complete surface area of the second guiding passage for oxidizing almost all nitrogen monoxide present in the flow of exhaust gases streaming through the second guiding passage to nitrogen dioxide. Consequently, the fourth guiding, passage guides unconverted nitrogen monoxide and the second guiding passage guides oxidized nitrogen dioxide to the common outlet, where both flows of exhaust gases are mixed so that the exhaust gas exiting the heat exchanger system lies within the desired NO:NO2 ratio interval, and more preferably in the vicinity of a 50:50 ratio.

According to an embodiment the further oxidation site (xx) of the third guiding passage comprises a catalyst for oxidising the further constituent.

According to an embodiment the fourth guiding passage comprises a selective catalytic reduction site for selective reduction of NO and NO2 in the flow of exhaust gases to mainly nitrogen (N2). A selective catalytic reduction (SCR) site reduces the total NOx levels within the flow of exhaust gases.

Since methane oxidation produces enough thermal energy for operating an SCR unit it is possible to reduce the NOx amount of the exhaust gas already at an early stage. Since a reduction agent, preferably urea, may be beneficial for the selective catalytic reduction reaction, it is preferred to provide the reduction agent to the exhaust gas upstream of the selective catalytic reduction coating. Even if the reduction agent injection may be arranged upstream of the heat exchanger system itself, it is more preferred to arrange the reduction agent injection device in the second flow reversing region since the temperature downstream of the methane oxidation catalyst, i.e. at the flow reversing region, is high enough to ensure that solid urea deposits in the system may be avoided. Additionally in the case of urea as reduction agent, the high temperatures allow for a conversion of urea to ammonia, which in turn increases the efficiency of the selective catalytic reduction.

According to an embodiment the fourth guiding passage comprises a selective catalytic reduction catalyst.

According to an embodiment the heat exchanger system comprises a first heat exchanger device incorporating the first and second guiding passages and the first flow reversing region, and a second heat exchanger device incorporating the third and fourth guiding passages and the second exhaust gas flow reversing region. If the first heat exchanger device and the second heat exchanger device are made as separate arrangements, they have the advantage that each device is less space demanding and that they may be arranged at different locations in a vehicle. On the other hand if both heat exchanger devices are incorporated into a single device, a compact heat exchanger system may be provided which is easily arranged in an exhaust gas aftertreatment system.

According to an embodiment the flow of exhaust gases through the exhaust gas inlet is adapted to be distributed between the first and third guiding passages, wherein the flow of exhaust gases preferably is adapted to be distributed generally evenly between the first and third guiding passages. This way a controllable NO:NO2 ratio and/or NO:NO2 ratio interval may be achieved.

According to an embodiment the heat exchanger system comprises an exhaust gas distribution device, particularly a valve, for controlling the amount of exhaust gas through the first and third guiding passages, respectively.

According to an embodiment the exhaust gas distribution device is adapted to be controlled in accordance with a sensed NO amount and/or NO2 amount and/or the NO:NO2 ratio in the flow of exhaust gases.

According to an embodiment the first and/or second flow reversing region is equipped with at least one urea injection device for injecting urea into the ex-haunt gas. Injection of urea into the exhaust gas improves the performance of the SCR site in an otherwise known manner.

According to an embodiment the first and/or second flow reversing region is equipped with at least one heater. A heater tray be used to control the temperature within the heat exchanger system, particularly for providing enough heat at a cold start or during low load application.

According to a second aspect of the disclosure an exhaust gas aftertreat-ment system for controlling exhaust gas emissions of an internal combustion engine, particularly at least the emissions of hydrocarbons and/or nitrogen oxides, is disclosed, comprising a heat exchanger system according to the first aspect of the disclosure. The exhaust gas aftertreatment system will gain similar or corresponding advantages as are disclosed in relation to the first aspect of the present disclosure above.

According to an embodiment a NOx sensor is arranged downstream of the heat exchanger system for sensing an NO amount and/or NO2 amount and/or an NO:NO2 ratio in the flow of exhaust gases leaving the heat exchanger system. A more detailed control of the exhaust gas aftertreatment system may thus be achieved.

According to an embodiment the exhaust gas aftertreatment system comprises a selective catalytic reduction unit and optionally a particulate filter, and wherein the heat exchanger system is arranged upstream of the selective catalytic reduction unit, preferably also upstream of the optional particle filter. The proper functionality of a selective catalytic reduction unit is dependent on the NO:NO2 ratio within the exhaust gases passing through it. Hence a combination of this kind improves exhaust emission control.

Moreover, in case of a heat exchanging system comprising a selective catalytic reduction site and a reduction agent injection, unused reduction agent from this heat exchanging system, such as urea or ammonia, may be transported to the selective catalytic reduction unit arranged downstream of the heat exchanger system. Alternatively or additionally to the reduction agent injection in the second flow reversing region, it is also possible to provide a reduction agent injection upstream of the selective catalytic reduction unit.

According to an embodiment the exhaust gas aftertreatment system comprises an oxidation catalyst, wherein the heat exchanger system is arranged downstream of the oxidation catalyst or in a bypass passage bypassing the oxidation catalyst. The oxidation catalyst not only controls the contents of the exhaust gases, but also the temperature of the exhaust gases.

According to a third aspect of the present disclosure a method for controlling exhaust gas emissions of an internal combustion engine is disclosed which comprises the step of using a heat exchanger system according to the first aspect and/or an exhaust gas aftertreatment system according to the second aspect. The method is given similar or corresponding advantages as are presented for the first and second aspects of the present disclosure.

According to a fourth aspect of the present disclosure a vehicle is disclosed which comprises a heat exchanger system according to the first aspect or an exhaust gas aftertreatment system according to the second aspect. The vehicle is given similar or corresponding advantages as are presented for the first, second and third aspects of the present disclosure.

According to an embodiment an engine of the vehicle is adapted to operate using compressed natural gas (CNG) or liquid natural gas (LNG). CNG and LNG both comprise methane, which according to the above gives an exothermic reaction when oxidised. Both also have other advantages, such as existing distribution networks in certain areas and other characteristics which have made them a focus for research into alternative fuels.

Further advantages and preferred embodiments are defined in the appending claims, the description and the figures.

BRIEF DESCRIPTION OF THE DRAWINGS

In the following, the principle of the disclosure is explained by means of or by embodiments depicted in the figures. Thereby, the figures are exemplary only and shall not be intended to define the scope of protection. This scope of protection is solely defined by the appending claims.

The figures show.

DETAILED DESCRIPTION

Figure 1:
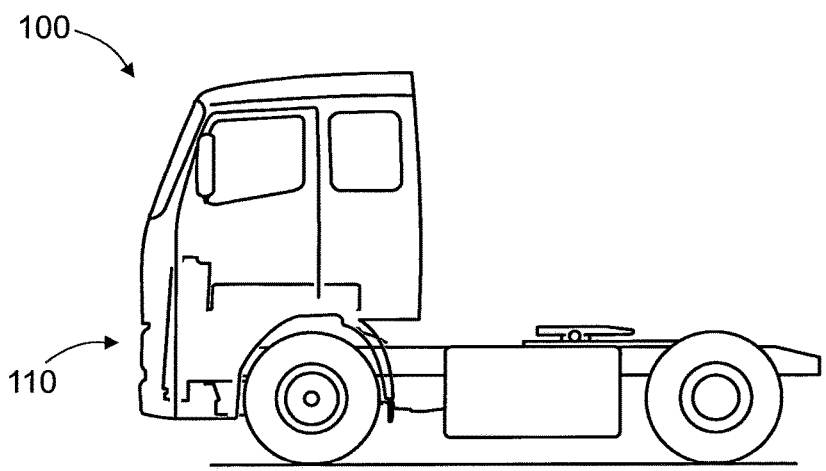
FIG. 1 a schematic illustration of a heavy duty vehicle which is provided with an embodiment of a heat exchanger system according to the present disclosure, FIG. 2 a schematic illustration of a first embodiment of the heat exchanger system, FIG. 3 a schematic diagram of the temperature of a downstream end of a NO oxidation site and the resulting NO2/NOx ratio, FIG. 4 a schematic illustration of a second embodiment of the heat exchanger system, FIG. 5 a schematic diagram of a temperature along the axial length of an embodiment of the disclosed heat exchanger system, FIG. 6 a schematic illustration of a third embodiment of the heat exchanger system, and FIG. 7 a schematic illustration of a fourth embodiment of the heat exchanger system.

In the following same or functionally similar elements are indicated by the same reference numerals.

FIG. 1 shows a schematic illustration of a heavy duty truck 100 which is provided with an embodiment of a heat exchanger system 110 according to the present disclosure. Also other types of vehicles may be provided with the heat exchanger system 110 of the present disclosure. The truck 100 is provided with an internal combustion engine 101 which preferably is run on either compressed natural gas (CNG) or liquefied natural gas (LNG) comprising methane (CH4). Other fuels or fuel combinations may be possible. Also a hybrid vehicle comprising both an internal combustion engine 101 of the above kind and an electric machine with a battery pack may be contemplated. The internal combustion engine 101 operates according to otherwise known principles and produces exhaust gases which generally are in need of aftertreatment due to emission regulations before being released through a not shown exhaust system and exhaust pipe 102 to the ambient.

Figure 2:
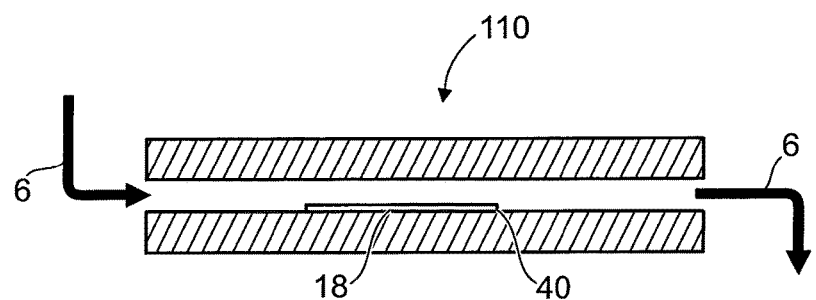

FIG. 2 shows schematically a principle illustration of a first embodiment of the heat exchanger system 1 10. The figure shows a heat exchanger system 1 10 having a heat exchanger through which a flow of exhaust gasses 6 passes. The heat exchanger 1 can in this embodiment be of any otherwise known kind and the details thereof are hence left out in this figure. A NO oxidation site 1 is located within the heat exchanger 1. The NO oxidation site 18 has a downstream end 40 which is located downstream of the NO oxidation site 18 with regard to the flow direction of the flow of exhaust gases 6. Merely as an illustrative example, the NO oxidation site 18 may have a surface area which in the figure be seen as the length along the flow of exhaust gasses 6 (i.e. horizontally in the figure) multiplied by the length in the cross-wise direction, which is the direction going, into the figure (i.e. not visible in the figure).

The flow of exhaust gases 6 comprises several different constituents, of which nitrogen monoxide (NO) and nitrogen dioxide (NO2) are two ones for which this heat exchanger system 1 10 is designed to handle. Nitrogen monoxide (NO) and nitrogen dioxide (NO2) are often referred to as nitrogen oxides (NOx) with a single, common expression. It may for several reasons be desirous to control the relationship between nitrogen monoxide (NO) and nitrogen dioxide (NO2), and especially the ratio there between: NO:NO2. In some contexts the ratio is instead expressed as one of the constituents in relation to "nitrogen oxides": e.g. NO2:NOx, but this is merely a simple recalculation of the earlier mentioned ratio, since NOx is generally held to be the sum of NO and NO2 and the relationship between the two expressions is thus singular. A ratio of 50:50, or 1:1, in terms of the NO:NO2 ratio may consequently be expressed as e.g. 50% as the NO2:NOx ratio. Other ways to express these ratios exist. Within this disclosure only the expressions "NO:NO2 ratio" and "NO2:NOx ratio" will be used.

Figure 3:
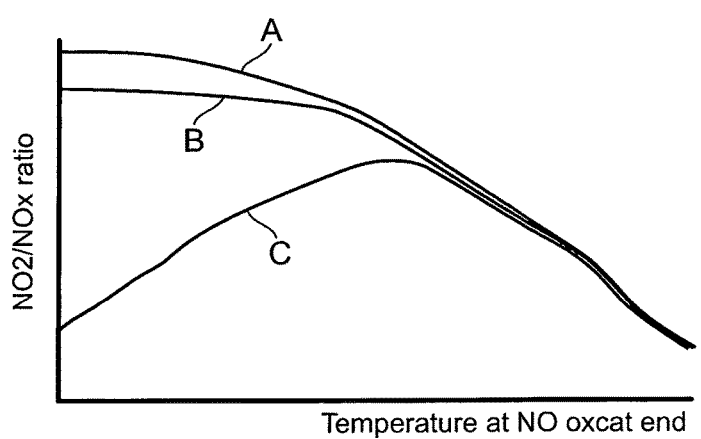

FIG. 3 discloses a diagram showing on the horizontal axis a temperature which in the diagram is the temperature of the downstream end 40 of the NO oxidation site 18 ("NO oxcat end"). On the vertical axis the NO2:NOx ratio is disclosed for the temperatures of the horizontal axis. Within the diagram there are three curves represented, A, B and C. The uppermost curve A represents the NO2:NOx ratio at chemical equilibrium under optimum conditions for each temperature if enough time is given for the chemical reaction to take place. The higher the temperature at the downstream end of the NO oxidation site 18, the lower the amount of NO2 in relation to NOx becomes, or in other words, the lower the amount of NO2 in relation to NO becomes. When the temperature thus is increased, more NO is produced at the expense of NO2. The opposite is also true, with a lowered temperature the higher the NO2 amount in the NO2:NOx ratio becomes. This means in general terms that when knowing the temperature distribution within the heat exchanger system 110 it is possible to design the NO oxidation site 18 such that its downstream end 40 is located at a temperature where the NO2:NOx (or the NO:NO2) ratio is within the desired interval. It should also be noted with regard to any one of the embodiments of the disclosure herein, that in order not to produce undesirably much NO in relation to NO2, it is advantageous to release some heat from the catalyst not to overheat it. In the case of providing the NO oxidation site 18 in a heat exchanger system, or even more advantageously in a counter flow heat exchanger system, the risk of overheating the NO oxidation site 18 is hence lowered.

The lowermost curve C generally represents the same as curve A, but the conversion for a catalytical reactor. For curve C the NO2:NOx ratio initially increases with increased temperature, up to a maximum point, after which the NO2:NOx ratio again decreases with further increased temperature. The reason for the inverted V-shape of the curve is that the chemical reaction is not given enough time to reach equilibrium due to that the kinetics limits the oxidation speed.

The middle curve, curve B, gently represents the same as curves A and B, in this case when NO is converted in a catalytically coated heat exchanger. Curve B generally follows curve C at the higher temperature region, since the kinetics are fast enough to reach equilibrium. At the lower temperature reason curve B departs from curve C, thanks to the catalytical process taking place at higher temperatures (except for at the outlet of the heat exchange) and that the kinetics thus are faster such that the oxidation process reaches further.

Going back to FIG. 2, it is, based on the knowledge of FIG. 3, consequently possible to design the heat exchanger system 110 such that the NO oxidation site 18 is positioned such that the flow of exhaust gases 6 at a downstream end 40 of the NO oxidation site 18 in use of the heat exchanger system 110 is arranged to proceed at a temperature within a predetermined temperature interval corresponding to a desired NO:NO2 ratio interval in the flow of exhaust gases 6. The desired NO:NO2 ratio interval may be any ratio interval which is reachable within the boundaries of FIG. 3 for the particular heat exchanger system 110 at hand. It should be noted that depending on operating conditions of the heat exchanger system 110, the desired NO:NO2 ratio interval may be relatively seen wider or narrower, even narrow enough to approximately represent a singular NO:NO2 ratio.

Figure 4:
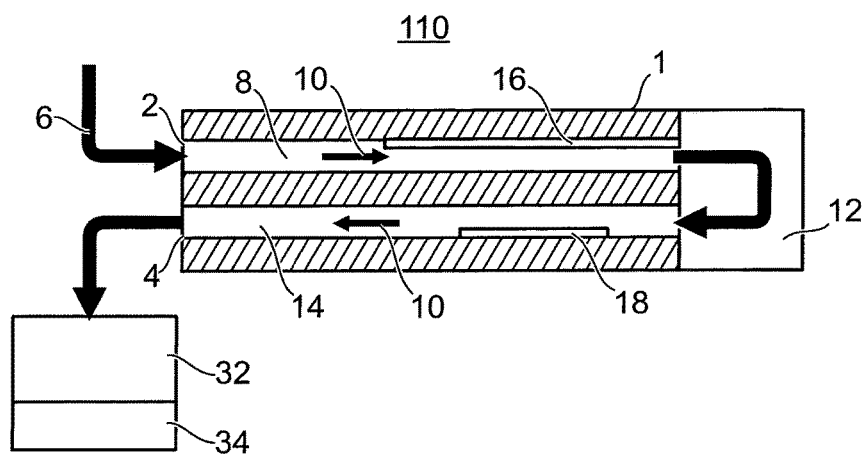

FIG. 4 shows schematically a principle illustration of a second embodiment of the heat exchanger system 110. As can be seen, the heat exchanger 1 included in the heat exchanger system 110 comprises an inlet 2 and an outlet 4 for the exhaust gas and its flow 6 produced in an internal combustion engine (not shown) and guided through an exhaust gas pipe (not shown). Thereby, the heat exchanger system 110 may be part of an exhaust gas aftertreatment system (not shown) for controlling environmentally harmful exhaust gas emissions. It should be noted that all or only part of the exhaust gas streaming through the exhaust gas aftertreatment system may be guided to the heat exchanger system 110.

The heat exchanger 1 itself comprises first guiding passage 8, e.g. at least one channel or a channel system as e.g. be present in a common honeycomb heat exchanger, for guiding exhaust gas 6 from the inlet 2 along a first flow direction (see arrow 10) to a first exhaust gas flow reversing region 12. In the flow reversing region 12, the exhaust gas from the first guiding passage 8 is reversed and guided through a second guiding passage 14 to the outlet 4. Also the second guiding passage 14 may be at least one channel or channel system as mentioned above. For exchanging heat, the first guiding passage 8 and the second guiding passage 14 are substantially arranged in parallel, thereby providing a counter-flow heat exchanger system 110.

Moreover, the first and second guiding passages 8, 14 are at least, partially coated by a catalytic material, wherein the first guiding passage 8 is coated with a hydrocarbon oxidation catalyst, preferably a methane oxidation catalyst 16. Further, the second guiding, passage 14 is coated with a NO oxidation catalyst 18. However, as can be seen in FIG. 4, not all of the active surface of the second guiding passage 14 is coated by the NO oxidation material, but only as much as is necessary for oxidizing enough NO to NO2 to gain a resulting desired NO:NO2 ratio (or desired NO:NO2 ratio interval) of for example approx. 50:50 (or for example approx. 40:60-60:40) downstream of the heat exchanger system.

This kind of heat exchanger system 110 is particularly preferred in connection with an internal combustion engine which is operated by natural gas as fuel, e.g. compressed natural gas (CNG) or liquid natural gas (LNG). The main disadvantages of using such fuels are the methane emissions in the exhaust gas, which should be avoided. Disadvantageously, the methane CH4 contained in such fuels generally cannot be oxidized by the ordinary oxidation catalysts due to the required high temperatures for the methane oxidation. Therefore, it has been suggested to coat the first guiding passage 8 of the heat exchanger 1 by a methane oxidation catalyst material 16 and use the heat of the highly exothermic oxidation reaction to heat the exhaust gas in the first guiding passage 8 by exchanging heat from the second guiding passage 14 back to the first guiding passage 8, which in turn increases the efficiency of the methane oxidation. Additionally, it has been realized that not only the methane oxidation is more efficient, but the produced heat may also be used for oxidizing NO means of the NO oxidation catalyst 18 coating in the second guiding passage 14.

From the state of the art, e.g. DE 02 21 174, it has been known to arrange a $NO_x$ storage catalyst or a selective catalytic reduction unit in a heat exchanger, respectively. Disadvantageously, this has the drawback that the storage has to be cleared from time to time and the NO:NO2 ratio is not adapted by the methane oxidation catalyst for an efficient working of the selective catalytic reduction unit. By arranging an NO oxidation site 18 in the heat exchanger system 1, a desired NO:NO2 ratio of approx. 50:50 may be produced which can be used in a selective catalytic reduction unit (not shown) arranged downstream of the heat exchanger system 1.

Thereby, it is preferred to coat only half of the length of the second guiding passage 14 with the NO oxidation site 18 from the flow reversion region 12 to avoid excessive oxidation of NO, which in turn reduces the efficiency of the selective catalytic reduction unit. By doing so the downstream end of the NO oxidation site 18 is located where a temperature within the heat exchanger system is predicted to be of a range creating the desired NO:NO2 ratio or ratio interval.

By providing such a heat exchanger 1 in an exhaust gas aftertreatment system emissions may be controlled over a wide range of applications by securing an optimal NO:NO2 ratio.

Figure 5:
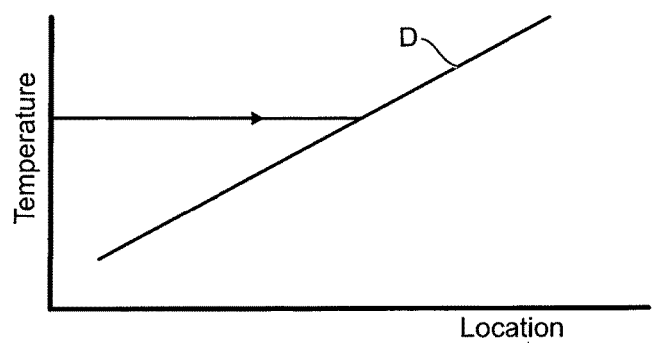

This is further elucidated in FIG. 5, in which on the horizontal axis represents the location along the axial extension of the counter-flow heat exchanger system 110 of FIG. 4 as viewed in this figure. Similar figures may be developed for any heat exchanger 1. The inlet 2 and outlet 4 are consequently represented on the left hand side, and the flow reversion region 12 is represented on the right hand side. The expected temperature at each location within the counter-flow heat exchanger system 110 of FIG. 4 is generally represented on the vertical axis. The location within the counter-flow heat exchanger system 110 at which to locate the downstream end of the NO oxidation site 18 is consequently found by taking the appropriate temperature for the desired NO:NO2 ratio e.g. from FIG. 3, and from the vertical axis going towards the right hand side, and to use the location where this temperature meets the curve as represented on the horizontal axis. Hereby not only a location of the downstream end of the NO oxidation site 18 for a desired NO:NO2 ratio may be found, but any location, for any ratio or ratio interval as desired may be found.

Figure 6:
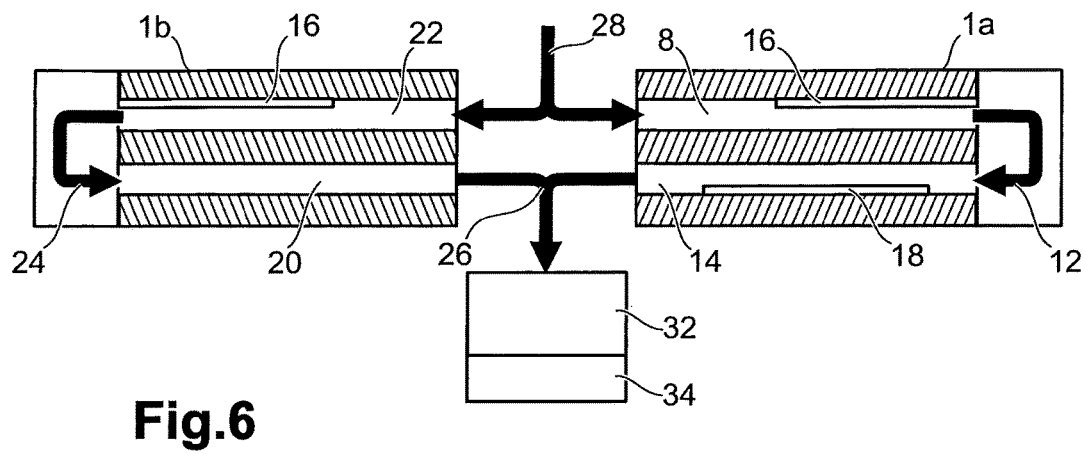

Instead of coating only the half of the length of the second guiding passage 14 by a NO oxidation catalyst 18 it has also been suggested to split the heat exchanger 1 into two separate devices 1a and 1b as can be seen in FIG. 6. Thereby, the first heat exchanger device 1a incorporates the first and second guiding passage 8, 14 and the first exhaust gas flow direction reversion region 12, wherein the second heat exchanger device 1b incorporates a third guiding passage 20, a fourth guiding passage 22, and an optional second exhaust gas flow direction reversing region 24. While the first heat exchanger device 1a comprises a NO oxidation catalyst 18 in the second guiding passage 14, such an oxidation, catalyst is omitted in the second heat exchanger device 1b.

Consequently, the NO amount of the exhaust gas streaming through the second heat exchanger device 1b comprises an almost unchanged NO amount compared to the NO amount present in the exhaust gas entering the heat exchanger system 110. On the other hand, the first heat exchanger device 1a provides the NO oxidation into NO2. Dependent on the size of the NO oxidation cata-lyst 18 in the second guiding passage 14, an almost complete conversion of NO to NO2 may be gained. This may be reached e.g. by coating almost the complete second guiding passage 14 with an NO oxidation catalyst 18, as depicted in FIG. 6. When both exhaust gas streams are mixed in a mixing region 26 downstream of the second and fourth guiding passage 14, 20, respectively, the exhaust gas exiting the heat exchanger system 110 has the desired NO:NO2 ratio of roughly 50:50, again.

For dividing the exhaust gas to the first and second heat exchanger devices 1a, 1b an exhaust gas distribution device 28 may be present which may be designed as a 3-way valve. As can be further seen in FIG. 6 both heat exchangers devices 1a, 1b comprise a methane oxidation catalyst 16.

Even if FIG. 6 shows the heat exchanger system 110 as separate devices 1a, 1b, the heat exchangers may be arranged in a single common device. It should be further mentioned that the heat exchanger may be designed as the known multi-channel heat exchanger, where a first part of the channels of the heat exchangers belongs to the first heat exchanger device 1a, and a second part of the channels belongs to the second heat exchanger device 1b, wherein the corresponding channels are coated with the corresponding oxidation catalysts. It should be further noted that in this case it may also be possible to provide only a single flow reversing region.

Figure 7:
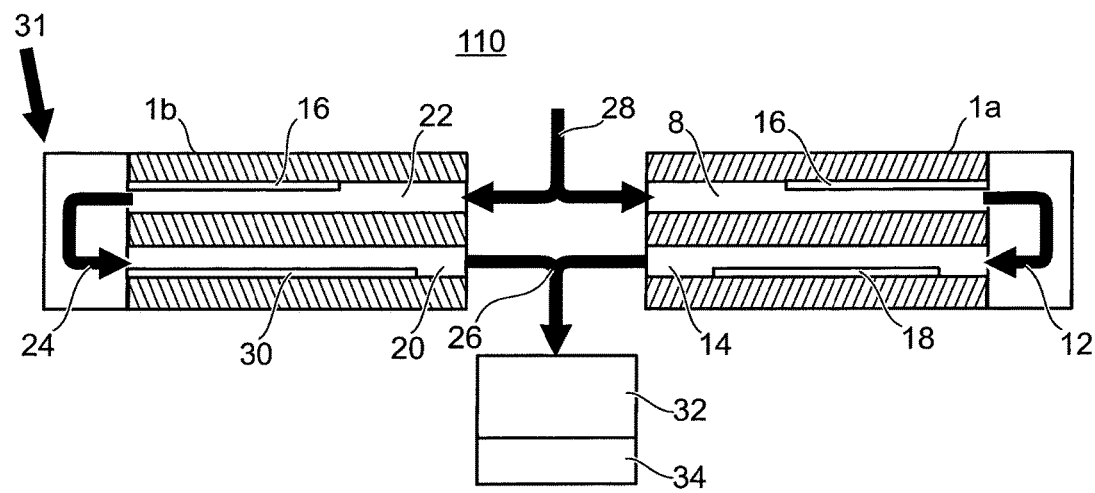

According to a further preferred embodiment, which is depicted in FIG. 7, the second heat exchanger device 1b may comprise a selective catalytic reduction coating 30 in the fourth guiding passage 20 for exploiting the heat produced by the methane oxidation reaction. Since for the selective catalytic reduction reaction a reducing agent such as urea or ammonia is needed, the exhaust gas should be equipped with the reducing agent upstream of the fourth guiding means. Even if in principle also a urea injection upstream of the complete heat exchanger system 110 is possible, it is preferred to inject urea into the second reversing region 24 (see arrow 31). This has at least two advantages. The first advantage is that urea is not wasted in the first heat exchanger device 1a. Secondly, it should be taken into account that the temperature of the exhaust gas upstream of the heat exchanger 1 is significantly less than the temperature of the exhaust gas in the second flow reversing region 24. Since urea tends to form de-posits of solid urea in case the temperature is too low, the urea injection in the second reversing region 24 avoids such deposits. Additionally, urea may be converted to ammonia due the high temperatures which in turn increased the efficiency of the selective catalytic reduction reaction in the fourth guiding passage 20 of the second heat exchanger device 1b.

For ensuring that even at low temperatures and low load applications, the temperature of the exhaust gas upstream of the urea injection is high enough, a heater may be arranged in the second exhaust gas flow direction reversing region 24, which is operated in case the exhaust gas temperature is not in the required temperature range. Thereby, the heater unit may be arranged upstream or downstream of the urea injection device. It goes without saving that such a heater may also be arranged in the first flow reversing region 12.

Even if a selective catalytic reduction coating 30 may be arranged in the second heat exchanger device 1b, it may also be preferred to arrange a particulate filter 32 and/or a further selective catalytic reduction unit 34 downstream of the heat exchanger system 110. Thereby, it is also possible to add a further urea injection device (not shown) for injecting urea to the SCR unit arranged downstream of the heat exchanger 1 for ensuring that sufficient urea is provided in the exhaust gas for the NOx reduction in the second selective catalytic reduction unit 34.

The heat exchanger system 110 may be arranged directly downstream of the internal combustion engine, but it is also possible to arrange the heat exchanger system 110 downstream of a further oxidation catalyst (not shown) or in a bypass (not shown) bypassing the oxidation catalyst. Thereby it can be ensured that sufficient NO is converted to NO2 for optimal emission controls.

In general, the heat exchanger system 110 and the exhaust gas after-treatment system save space and are rather costless. Moreover, since the desired NO:NO2 ratio or ratio interval can be provided, the legal requirements concerning the exhaust gas emissions may be met.

Many alterations may be made to the disclosed heat exchanger system 110 without departing from the scope and idea behind it. Such alterations may be to apply not a single guiding passage, but a set of smaller guiding passages, each having the features of the disclosed embodiments. The guiding passages may also have any cross-sectional shape, such as rectangular, triangular or circular. Further, if nothing else is said the whole width of each guiding passage, from its upstream end to its downstream end, is provided with a coating such as the NO oxidation site 18. It may however be that a lesser width is coated if found advantageous. Also, an outer housing may be present to cover and protect the disclosed heat exchanger system. Such a housing may take any form, such as cuboid or cylinder. The flow reversing region may also be angular or rounded.

The invention claimed is:

1. A heat exchanger system for treatment of a flow of exhaust gases in an exhaust gas aftertreatment system of a vehicle, the heat exchanger system comprising a heat exchanger, wherein the heat exchanger comprises:
    a first guiding passage,
    a second guiding passage, and
    a flow reversing region arranged between the first guiding passage and the a second guiding passage, whereby the first guiding passage is arranged to guide the flow of exhaust gases along a first flow direction towards the flow reversing region, and the second guiding passage is arranged to guide the flow of exhaust gases from the flow reversing region in a second flow direction, such that heat may be exchanged between the flow of exhaust gases in the second guiding passage and the flow of exhaust gases in the first guiding passage,
    a nitrogen monoxide (NO) oxidation site for oxidising nitrogen monoxide (NO) to nitrogen dioxide (NO2) in the flow of exhaust gases, wherein the NO oxidation site comprises an NO oxidation catalyst, and a further oxidation site for oxidising a further constituent of the flow of exhaust gases, the further oxidation site comprises a catalyst for oxidising the further constituent, wherein the further oxidation site is arranged within the first guiding passage;

the NO oxidation site is positioned within the second guiding passage, downstream of the further oxidation site;

the NO oxidation site is positioned such that the flow of exhaust gases at a downstream end of the NO oxidation site in use of the heat exchanger system is arranged to proceed at a temperature within a predetermined temperature interval corresponding to a desired NO to NO2 (NO:NO2) ratio interval in the flow of exhaust gases, and the further oxidation site is a hydrocarbon oxidation site for oxidising methane (CH4) to mainly carbon dioxide (CO2).

2. The heat exchanger system according to claim 1, wherein the position of the downstream end of the NO oxidation site is adapted to the size and position of the further oxidation site.

3. The heat exchanger system according to claim 1, wherein the heat exchanger system is a counter-flow heat exchanger system, whereby the second guiding passage is arranged to guide the flow of exhaust gases in the second flow direction which is generally opposite to the first flow direction of the first guiding passage.

4. The heat exchanger system according to claim 1, wherein the NO oxidation site has an upstream end opposite to the downstream end, which upstream end is positioned immediately adjacent the flow reversing region.

5. The heat exchanger system according to claim 1, wherein the further oxidation site is positioned immediately adjacent the flow reversing region.

6. The heat exchanger system according to claim 1, in which the desired NO to NO2 (NO:NO2) ratio interval is 30:70-70:3.

7. The heat exchanger system according to claim 1, in which the predetermined temperature interval is 350-420° C.

8. The heat exchanger system according to claim 1, wherein an exhaust gas inlet is arranged to the first guiding passage, and an exhaust gas outlet is arranged to the second guiding passage.

9. The heat exchanger system according to claim 1, wherein the downstream end of the NO oxidation site is positioned within a middle third part between the flow reversing region and a downstream end of the second guiding passage.

10. The heat exchanger system according to claim 1, wherein a surface area of the second guiding passage is coated by the NO oxidizing catalyst to at least 33%.

11. The heat exchanger system according to claim 1, further comprising a third guiding passage for guiding at least part of the flow of exhaust gases from the exhaust gas inlet to a second flow reversing region, and a fourth guiding passage for guiding the flow of exhaust gases from the second flow reversing region to the exhaust gas outlet (4).

12. The heat exchanger system according to claim 11, wherein the third guiding passage comprises a further oxidation site for oxidising a further constituent of the flow of exhaust gases.

13. The heat exchanger system according to claim 12, wherein the further oxidation site of the third guiding passage is a hydrocarbon oxidation site for oxidising hydrocarbon (HC) to mainly carbon dioxide (CO2) and water (H20), more preferably for oxidising methane (CH4).

14. The heat exchanger system according to claim 12, wherein the further oxidation site of the third guiding passage comprises a catalyst for oxidising the further constituent.

15. The heat exchanger system according to claim 11, wherein the fourth guiding passage comprises a selective catalytic reduction site for selective reduction of NO and NO2 in the flow of exhaust gases to mainly nitrogen (N2).

16. The heat exchanger system according to claim 15, wherein the fourth guiding passage comprises a selective catalytic reduction catalyst.

17. The heat exchanger system according to claim 11, wherein the heat exchanger system further comprises a second heat exchanger device (1b) incorporating the third and fourth guiding passages and the second exhaust gas flow reversing region.

18. The heat exchanger system according to claim 11, wherein the flow of exhaust gases through the exhaust gas inlet is adapted to be distributed between the first and third guiding passages, wherein the flow of exhaust gases is adapted to be distributed generally evenly between the first and third guiding passages.

19. The heat exchanger system according to claim 11, further comprising an exhaust gas distribution device for controlling the amount of exhaust gas through the first and third guiding passages, respectively.

20. The heat exchanger system according to claim 19, wherein the exhaust gas distribution device is adapted to be controlled in accordance with a sensed NO amount and/or NO2 amount and/or the NO:NO2 ratio in the flow of exhaust gases.

21. The heat exchanger system according to claim 1, wherein the first and/or second flow reversing region is equipped with at least one urea injection device for injecting urea into the exhaust gas.

22. The heat exchanger system according to claim 1, wherein the first and/or second flow reversing region is equipped with at least one heater.

23. An exhaust gas aftertreatment system for controlling exhaust gas emissions of an internal combustion engine, comprising a heat exchanger system according to claim 1.

24. The exhaust gas aftertreatment system according to claim 23, wherein a NOx sensor is arranged downstream of the heat exchanger system for sensing an NO amount and/or NO2 amount and/or an NO:NO2 ratio in the flow of exhaust gases leaving the heat exchanger system.

25. The exhaust gas aftertreatment system according to claim 23, wherein the exhaust gas aftertreatment system further comprises a selective catalytic reduction unit, and wherein the heat exchanger system is arranged upstream of the selective catalytic reduction unit.

26. The exhaust gas aftertreatment system according to claim 23, wherein the exhaust gas aftertreatment system further comprises an oxidation catalyst, wherein the heat exchanger system is arranged downstream of the oxidation catalyst or in a bypass passage bypassing the oxidation catalyst.

27. A method for controlling exhaust gas emissions of an internal combustion engine comprising the step of using a heat exchanger system according to claim 1.

28. A vehicle, comprising a heat exchanger system according to claim 1.

29. The vehicle according to claim 28, wherein an engine of the vehicle is adapted to operate using compressed natural gas (CNG) or liquid natural gas (LNG).

* * * * *